Sept. 18, 1962     G. L. ESTERSON     3,054,946
METHOD FOR MEASURING ELECTRICAL CONDUCTIVITY OF FLUIDS
Original Filed Oct. 29, 1956     4 Sheets-Sheet 1

INVENTOR
Gerald L. Esterson,
BY
John B. Brody
ATTORNEY

Sept. 18, 1962  G. L. ESTERSON  3,054,946
METHOD FOR MEASURING ELECTRICAL CONDUCTIVITY OF FLUIDS
Original Filed Oct. 29, 1956  4 Sheets-Sheet 2

INVENTOR
Gerald L. Esterson,
BY John B. Brady
ATTORNEY

Sept. 18, 1962 G. L. ESTERSON 3,054,946
METHOD FOR MEASURING ELECTRICAL CONDUCTIVITY OF FLUIDS
Original Filed Oct. 29, 1956 4 Sheets-Sheet 3
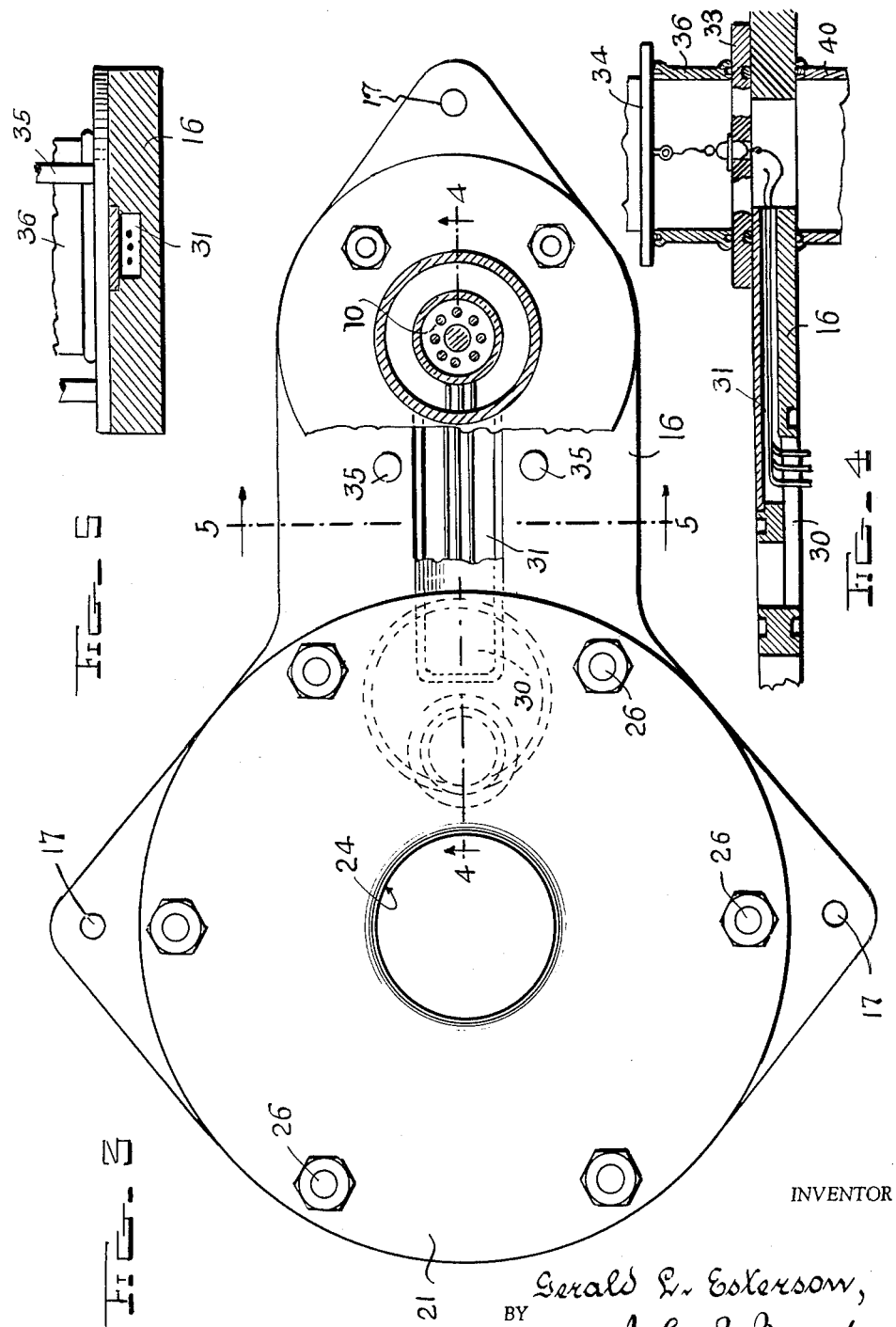
INVENTOR
Gerald L. Esterson,
BY John B. Brady
ATTORNEY Sept. 18, 1962     G. L. ESTERSON     3,054,946
METHOD FOR MEASURING ELECTRICAL CONDUCTIVITY OF FLUIDS
Original Filed Oct. 29, 1956     4 Sheets-Sheet 4
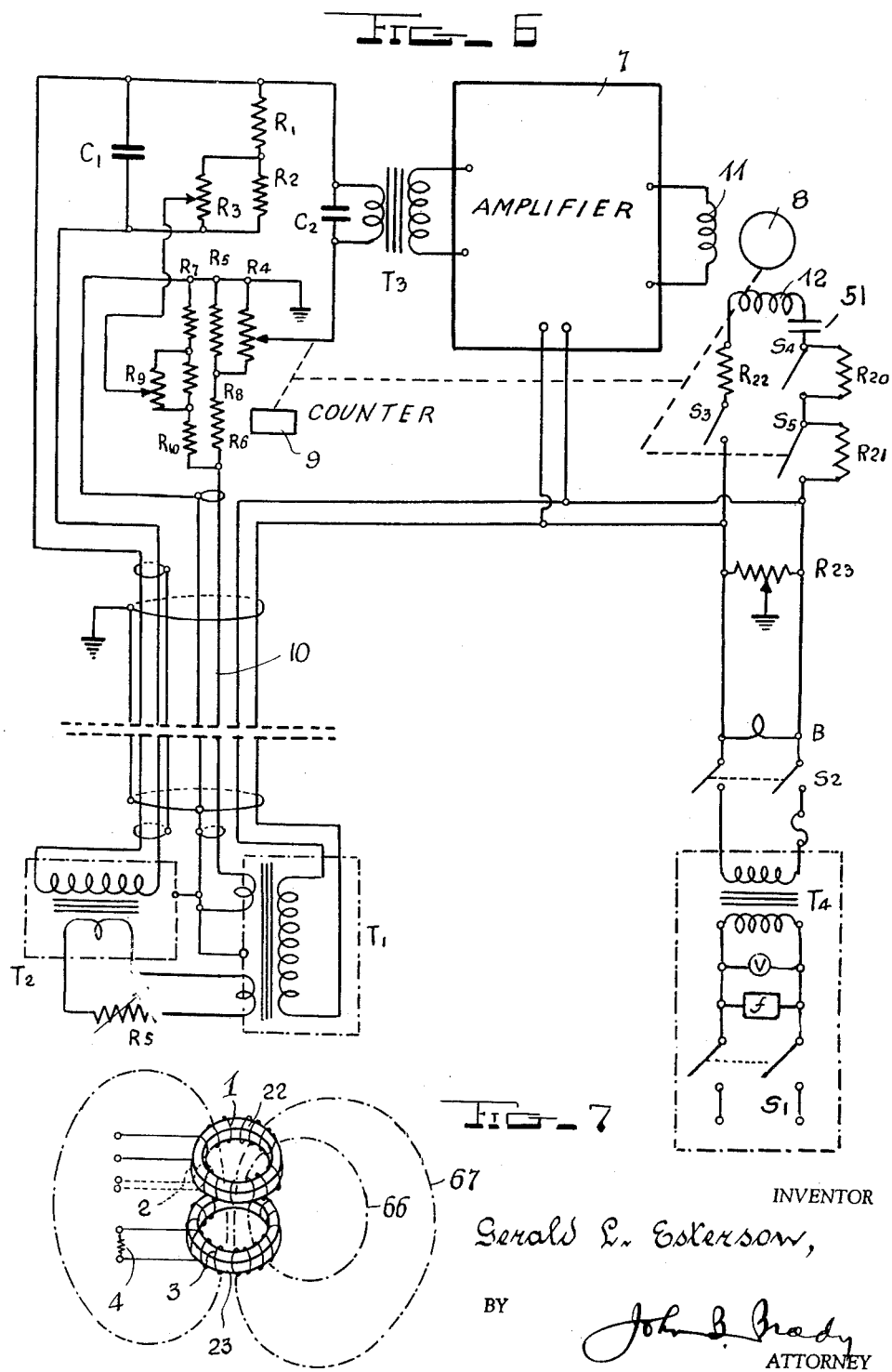
INVENTOR
Gerald L. Esterson,
BY John B. Brady
ATTORNEY

United States Patent Office 3,054,946
Patented Sept. 18, 1962

3,054,946
METHOD FOR MEASURING ELECTRICAL
CONDUCTIVITY OF FLUIDS
Gerald L. Esterson, Clayton, Mo.
(7070 Washington Ave., University City 30, Mo.)
Original application Oct. 29, 1956, Ser. No. 618,760, now
Patent No. 2,869,071, dated Jan. 13, 1959. Divided
and this application Jan. 6, 1959, Ser. No. 785,774
5 Claims. (Cl. 324—30)

My invention relates to a method for determining the electrical conductivity of fluids.

This application is a division of my application, Serial Number 618,760, filed October 29, 1956, for Apparatus for Measuring Electrical Conductivity of Fluids, now Patent No. 2,869,071.

One of the objects of my invention is to provide a simplified method for determining the electrical conductivity of fluids with a high degree of precision.

Another object of my invention is to provide an improved method for subjecting fluid to an electromagnetic field and determining the influence thereof upon a measuring circuit for determining conductivity of the fluid.

Other and further objects of my invention reside in the method for measuring the electrical conductivity of fluids as set forth more fully in the specification hereinafter following by reference to the accompanying drawings which illustrate apparatus for carrying out the improved method, in which:

FIG. 3 is a plan view of the immersible head shown in FIG. 2;

FIG. 4 is a fragmentary longitudinal sectional view taken on line 4—4 of FIG. 3 and showing the cable channels provided in the non-magnetic mounting plate for connecting the cable which extends from the equipment to the immersible head for electrically connecting the exciting winding, the current transformer and the reference voltage winding with the equipment;

FIG. 5 is a transverse sectional view taken on line 5—5 of FIG. 3 and further illustrating the cable channels represented in FIG. 4;

Figure 1:
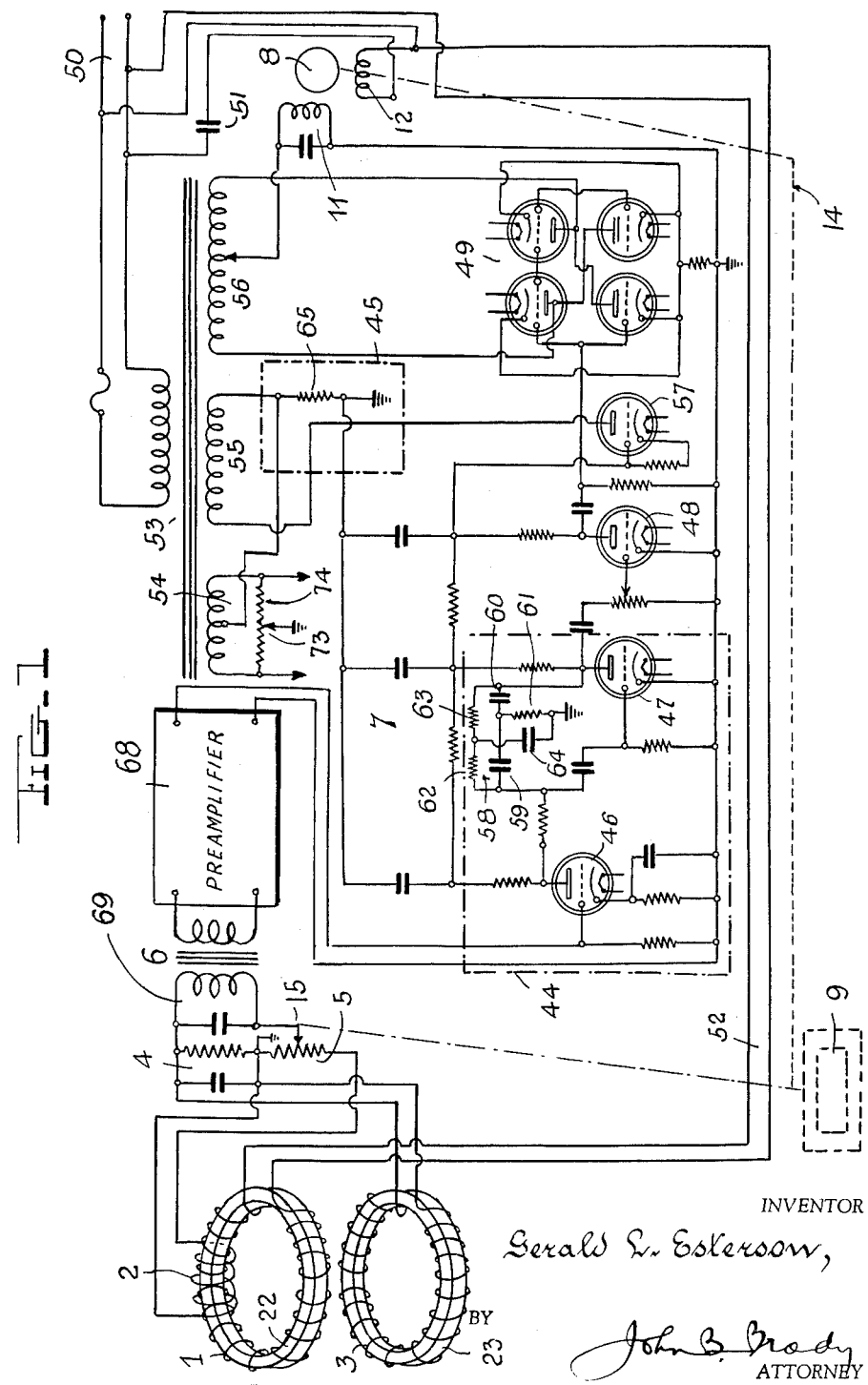
FIGURE 1 is a schematic wiring diagram of the circuit arrangement showing the conductivity measuring system of my invention.
Figure 2:
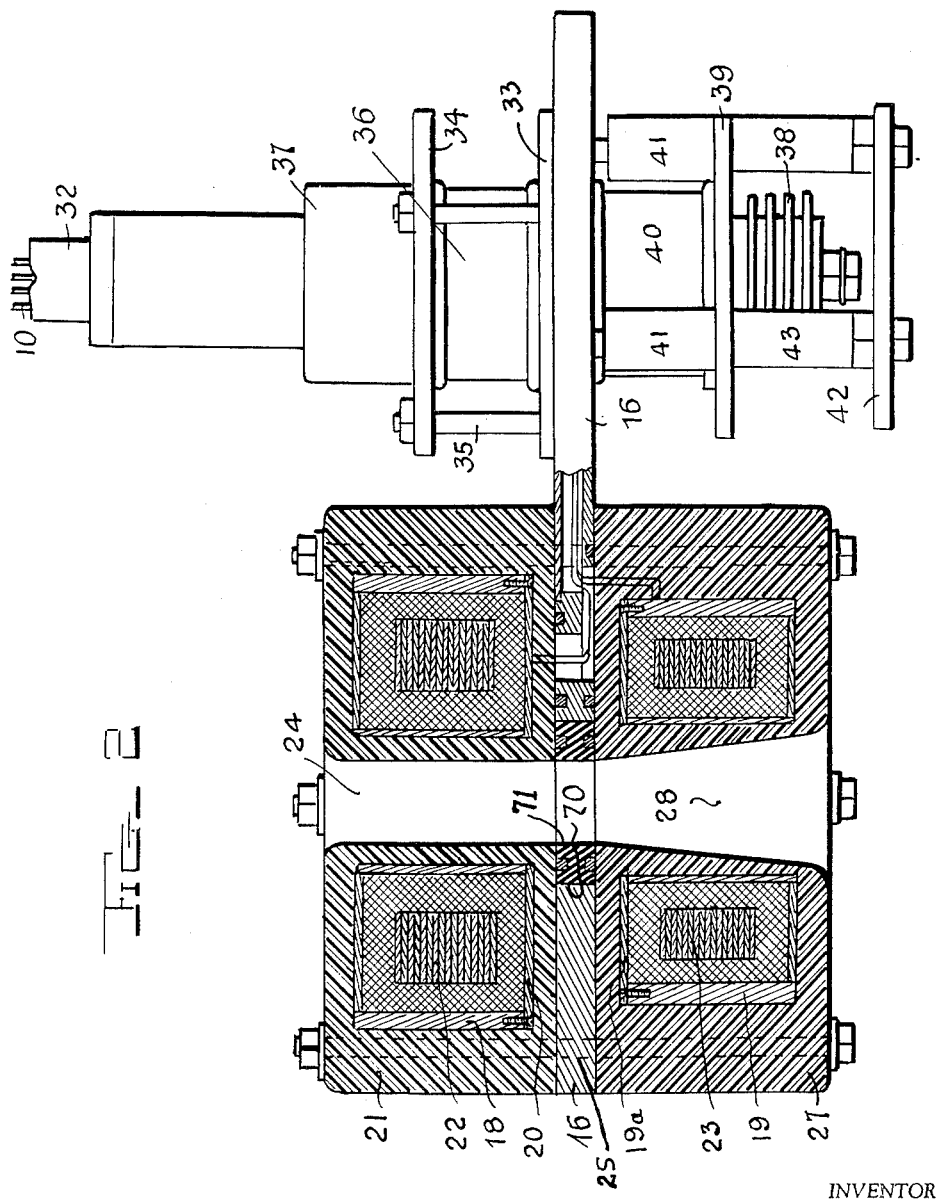
FIG. 2 is an elevational view partially in vertical section showing the immersible head used in the measuring system of my invention.

FIG. 6 is a diagrammatic view of the circuits leading from the circuit components in the immersible head to the amplifier system in the measuring instrument of my invention, the view illustrating the manner in which the effect of the equivalent resistance of the fluid is measured; and FIG. 7 is a theoretical view explaining the theory of operation of the conductivity sensing element of the instrument of my invention.

My invention is directed to a method for measuring the electrical conductivity of fluids generally and has wide application in conductivity determinations. For the purpose of illustrating the principles of my invention I shall describe my invention as applied to the determination of the conductivity of sea water, but it will be understood that my invention is applicable to the measurement of conductivity of fluids of various kinds.

I provide an apparatus which induces an electric current in the field subject to the determination of electrical conductivity. This current is detected by using a current transformer. The signal from the current transformer is directly proportional to conductivity and is indicated by a self-balancing potentiometer which drives an indicating counter. The instrument eliminates polarization and fouling problems.

I provide an immersible head which includes a pair of spatially related toroidal windings, one of which has a reference voltage winding inductively associated therewith. The windings are associated with adjustably controlled circuits leading to the input of a balanced amplifier system. The output of the amplifier system operates one phase of a two-phase motor, the other phase of which is controlled by the phase sensitive power detector in the amplifier system. The differential action thus obtained is utilized to drive a counter from the two-phase motor and to automatically adjust a potentiometer in the input system, whereby conductivity may be directly read from a calibrated scale on the instrument control panel, and to maintain the circuit system in a precision condition of balance, special provision is made in the circuits of the amplifier system for stabilizing the amplifier so that accurate measurements may be made.

The lines of force which are established by one of the toroidal windings threads the current transformer winding and is dependent upon the conductivity of the fluid in which the windings are immersed.

The induction conductivity indicator system of my invention operates as a current transformer. The two toroidal coils which are exposed to the sea water establish a field therebetween which is measured in the system of my invention to determine conductivity.

Winding 1 is excited by standard power circuit 60 cycle voltage. The other coil, which is adjacent to the exciting coil, is the current transformer containing winding 3. Current flow in the sea water which links both coils produces flux and consequently voltage produced in winding 3. Since winding 3 is terminated in a low resistance it operates as a current transformer, that is a current flowing in its load, that is 4, 's proportional to the current linking the pickup circuit winding 3 flowing in the sea water. A reference voltage from winding 2 on the exciting core is applied to the multi-turn potentiometer 5 and this voltage is subtracted from the voltage across the current transformer load 4.

The resultant signal thus derived is applied to input transformer 6 which is connected to the input circuit of preamplifier 68 through tuned circiut 69 adjusted to power line frequency (such as 60 cycle AC. 115 volts) the output of which connects to the high gain amplifier 7 the output voltage of which is applied to one phase of the two-phase motor 8. The other phase of the motor is connected to the power line through condenser 51 for proper operation of the phase sensitive power detector. The shaft of the motor 8 is geared both to the potentiometer 5 and to a counter 9. The counter indication gives the conductivity of the fluid in which the two coils are immersed. The accuracy of this reading is of the order of 200ths of 1% of full scale. The instrument reads as high as six mhos per meter which covers a concentrate even greater than the salinity of sea water, but the range of the instrument is easily altered by changing the values of the pertinent resistors to cover higher or lower spans of conductivity.

One of the important structural features of my invention is that the two coils shall be substantially insulated in the sea water but the placement thereof with respect to spatial relationship or concentric relationship is not critical, although it is desirable that the coils be mounted coaxially.

Referring to FIG. 6, I have shown adjustment means for the circuits from the pickup coil constituted by resistors leading to the potentiometer circuit and to the input of the high gain amplifier. This arrangement of resistors comprises resistors $R_7$, $R_8$, $R_9$, and $R_{10}$, which are used in adjusting the zero setting of the potentiometer $R_4$ and counter. The zero setting is adjustable by means of the sliding tap of resistor $R_9$. The calibration of the instrument is adjustable by varying a tap on resistor $R_3$, which is connected in parallel with resistor $R_2$. The condenser $C_1$ is fixed when the instrument is manufactured and does not have to be adjusted during use of the instrument.

In order to protect the multi-turn potentiometer $R_4$ from damage, due to off-scale readings, the motor M is geared to operate a micro-switch $S_5$ which adds resistance in series with the line phase of motor M, when the slider on potentiometer $R_4$ exceeds the maximum or minimum range. Provision is made for turning off motor M by means of switch $S_3$ or for reducing the torque output by adding resistance $R_{20}$ by means of switch $S_4$ in the line phase.

Variable resistor $R_{23}$ serves the purpose of reducing to a minimum any voltages coupled into the current transformer leads from the high voltage circuitry and may be maintained in a set position after initial adjustment.

The system of my invention does not employ high frequencies but operates wholly from standard power circuit frequencies. The fact that I provide a current transformer system insures high precision in readings of salinity of the sea water. Moreover, such precision is accomplished by a circuit of extreme simplicity.

My instrument reads conductivity directly on a linear scale and does not depend upon the displacement of a balancing resistance in a circuit linking the exciter and pickup toroids.

The diagrammatic view in FIG. 7 represents the current path through the fluid which is subject to the measurement of electrical conductivity at $R_s$ which is the fluid path in which this diagrammatical circuit is shown energized through transformer circuit $T_1$ connected with the equipment through the shielded multi-conductor cable 10 which extends from the head immersed in the fluid subject to conductivity measurement to the apparatus. Transformer $T_2$ connected in the fluid path $R_s$ serves as a pickup means to detect current flow in conducting path $R_s$. The adjusting circuits $R_1$–$R_{10}$ connect to the transformer $T_3$ which connects to the input of the unit I have designated as amplifier 7, the output of which connects to one phase of the motor 8 constituted by winding 11.

The amplifier 7 includes a pre-amplifier in addition to the balanced amplifier capable of increasing the voltage applied to phase winding 11 to the required operating amplitude. The other phase winding 12 connects to the power supply source (115 volts 60 cycles) through capacitor 51 and isolation transformer $T_4$ and the circuit components including switch $S_2$, variable-resistor $R_{23}$, series resistors $R_{20}$, $R_{21}$ and $R_{22}$ respectively controlled by switches $S_4$, $S_5$ and $S_3$. The motor M connects through shaft 14 to the adjustable contactor 15 on potentiometer 5 and to the counter 9 as heretofore explained. FIGS. 1–5 show the structure of the immersible head more clearly as consisting of a central plate of non-magnetic material, such as brass, shown at 16, which is supportable within a suitable frame through apertures 17 with an enlargement at one end converging into a relatively narrow body structure and tapered to a terminus. The enlarged end of the plate 16 serves as a support for mounting the excited winding 1, the reference voltage winding 2, in the position above plate 16 and the current transformer 3 in a position below plate 16. To protect the windings against moisture from the fluid in which the windings are immersed and electrically shield the windings, I provide non-magnetic shields comprising toroidal channels 18 and 19 each of which is sealed by an annular cover plate represented at 20 and 19a, respectively, for encasing the windings. The windings are wound on toroidal cores of magnetic material represented at 22 and 23. Magnetic core 22, for example, is formed of ninety ring laminations (R–2 laminations, fabricated by Allegheny-Ludlum, 4750 steel with No. 11 finish), which are varnished (General Cement No. 562 varnish) and clamped together to dry. The varnished core is wrapped with varnished cambric insulating tape, and then wound in two layers with 575 turns of No. 24 enameled copper wire. The first layer is wound until the ends of this layer are adjacent to one another, and then the second layer is wound (after covering the first with an insulating layer of varnished cambric tape) back around the core so that no net current flows around the central hole; a layer of insulating tape is then wound to cover the wound core.

The shield 18 into which wound core 22 fits is fabricated of the 1 13/16" lengths of hard drawn seamless brass tube and a brass disc 1/16" thick with a 1 3/8" hole therein. When assembled with the disc fitted in one end of each tube and soft-soldered, a U-shaped channel is formed into which the wound core 1 is placed. Provision for admitting 115 volt power to winding 1 and leading off the reference voltage from the winding 2 is made by means of glass-to-metal seal-throughs soft soldered into four holes in the side wall of the shield 18. Magnetic shielding to reduce stray coupling between cores is effected by placing five laminations (same steel as used for core) above the winding. The toroidal shield 18 with windings 1—2 therein is then filled with insulation material such as "Epon" resin, and the cover plate 20 which may be "Teflon" screwed into position to seal the shield. Six inch leads are soldered to the external ends of the seal-throughs. The shielded winding and core is potted in "Epon" resin, as indicated at 21; the lead of the reference voltage winding 2 which is to be grounded is connected to the shield by flowing solder over the glass insulator of the appropriate seal-through, or connecting a separate lead under one of the screws holding the "Teflon" cover plate 20 in position. The potted unit containing the exciting winding 1 and core 22 is finished by milling flat the potted surface which is to fit against the mounting plate 16, reaming the center hole 24 to size (FIGS. 2–3), and drilling mounting holes 25 around the periphery for the core studs 26.

Epoxy resin used in the potting is formulated as follows: 100 parts "Epon" resin 828, 13 parts curing agent D, 33 1/3 parts silica flour. The resin and curing agent are available from the Shell Chemical Corporation. The curing schedule is as follows: 1 1/2 hours at 95° C. and a post-cure of 1 1/2 hours at 115°, 1/2 hour of the foregoing times of cure is allowed for the pot to come to curing temperature. Curing agent Z is recommended for higher resistance to water absorption and higher insulation resistance. The addition of silica flour to the above formulation of the resin results in lower water absorption.

The current transformer 3 is arranged on the lower side of the non-magnetic plate 16. The current transformer includes the steel core 23 which is formed of seventy-five ring laminations (R–1 laminations, fabricated by Allegheny-Ludlum, Mumetal steel with No. 11 finish), which are varnished and clamped together to dry. The varnished core is insulated similar to core No. 1 and astatically wound in four layers with 1000 turns of No. 23 enameled copper wire.

The shield 19 into which wound core 23 fits is fabricated of two 1 11/16" lengths of hard drawn seamless brass tube and a brass disc 1/16" thick with a 1 1/2" hole therein. When assembled with the disc fitted into one end of each tube and soft-soldered, a U-shaped channel is formed into which the core 23 with winding 3 therein is placed. The three six inch leads (two from the winding and one from the shield) are brought out through holes in the "Teflon" cover 19a which is screwed onto the shield 19. After inserting the wound core 23 into the toroidal channel constituting the shield 19, Epon resin is introduced over the winding 3 and the "Teflon" cover plate is screwed on and the shielded wound core 23 potted in "Epon" resin, as indicated at 27. The ground connection to the shield 19 may be made by soldering a lead directly to the shield 19 or connecting the lead under one of the screws holding the "Teflon" disc 19a in position. The current transformer core unit 19—3—23 is finished by milling flat the surface of the potted resin 27 which is to fit against the mounting plate 16, finishing the center hole 28 to size (FIGS 2-3), and drilling mounting holes around the periphery for the core studs 26. The mounting plate 16 is apertured at 70 between the potted resin unit 27 and the potted resin unit 21 to receive the annular resin bushing 71 which prevents a current flow path not linking winding 3. The bushing 71 provides a tight water seal with respect to the bores 24 and 28 in the potted resin units 21 and 27. Annular grooves in opposite faces of the bushing 71 receive O rings that insure a fluid-tight seal with respect to the potted resin units 21 and 27. The core 23 is so positioned in the shield 19 that stray coupling, due to a small magnetic field which remains, is substantially reduced. The epoxy resin make-up and cure are the same as those previously described.

The leads from the exciter winding 1, reference voltage 2 and current transformer 3 extend through grooves 30 and 31 formed in the plate 16 and extending from a position adjacent the leads extending from the windings 1, 2 and 3 to the cable assembly, represented at 32. The cable assembly 32 is attached to plate 16 through a bulk-head 33 to which is connected the flange 34 of the Cannon cable receptacle which is spaced from the bulk-head 33 through connecting studs 35 and the cylindrical spacer 36. The Cannon plug for the shielded multiple conductor cable 10 is shown at 37.

The equipment thus far described provides for the measurement of electrical conductivity and in the particular application shown the salinity of sea water. To provide for equalization of pressure in the wiring chamber with that of the surroundings, I arrange a bellows-type unit shown at 38 supported beneath the mounting plate 16 by the bellows bulk-head 39 spaced from the undersurface of mounting plate 16 by means of spacer 40 centered by means of the centering spacers 41. The lower bulk-head 42 is spaced from the bellows bulk-head 39 by bellows assembly studs 43. The bellows assembly 38 is thus free to respond to pressure conditions of the sea water. The sea water is free to circulate around the toroidal units through the hollow bores 24 and 28. The lower bulk-head 42 serves the purpose of protecting the bellows 38 from damage by fouling from below. O rings are provided at opposite ends of the spacing sleeves 36 and 40 for sealing the spacing sleeves with respect to the mounting plate 16, the bellows bulk-head 39, and between the bulk-head 33 and the flange 34 of the Cannon receptacle.

The high gain amplifier 7 is constructed to eliminate harmonics of the power line frequency which condition is secured by the arrangement of the circuit components which I have indicated within the dotted lines 44 and 45 in FIG. 1. It will be observed that the amplifier comprises a multiplicity of stages constituted by electron tubes 46, 47 and 48 coupled with a balanced electron tube assembly represented at 49, the output circuit of which controls the winding 11 leading to one phase of the motor 8. The other phase of motor 8 constituted by winding 12 is connected to the power supply circuit (60 cycles 115 volts) indicated at 50 through phasing condenser 51. Power is supplied from the 115 volt source 50 through leads 52 to the exciting winding 1 wound on toroidal core 22. The power for the several electron tubes is provided through transformer 53 and the several secondary windings thereon indicated at 54, 55 and 56, and including the power supply circuit represented at 57. I provide very substantial stability for operation of the amplifier system by means of the coupling circuit interposed between the output of amplifier tube 46 and the input of amplifier tube 47, shown at 58. This coupling circuit consists of a pair of condensers 59 and 60 connected electrically in series between the output circuit of tube 46 and the output circuit of tube 47 and grounded therebetween through resistor 61. The pair of series connected condensers is shunted by means of series connected resistors 62 and 63 connected to ground therebetween through condenser 64. One side of the secondary winding 55 and the midtap of secondary winding 54 are connected to ground through resistor 65. I have found this arrangement highly stable and capable of improving the precision readings obtained in the system of my invention. The direct reading counter 9 is driven by motor 8 through shaft 14 which also drives the adjusting tap 15 on resistor 5 in the input system as heretofore explained.

In FIG. 7 I have shown a schematic diagram of the sea water current flow paths 66 and 67 developed by the exciter winding 1 on core 22. It will be noted that these sea water current flow paths extend through the centers of the toroids and act as the secondary winding of a transformer and may have for example an induced potential of 9.2 volts. The amount of current flowing depends primarily on the length and diameter of the hole, as for any conductor, and the conductivity of the water in the hole. (FIG. 7.)

The current flowing is measured by means of the second toroid 3 which is mounted adjacent to and coaxially with the exciting toroid 1. Thus, the electric current flows in a one-turn loop through the hole and the outside sea water about this core. If the winding on this core contains many turns and is shorted by a low resistance, a current transformer is formed and the winding current is equal to the sea water current divided by the number of turns. The resulting voltage across the low resistance is directly proportional to the conductivity of the water in the hole.

A reference voltage is obtained by a one or more turn secondary 2 on the exciting core 22, and is applied to a multiturn, precision, variable resistor 4. The voltage tapped from the latter is subtracted from the signal voltage and this error signal applied to the self-balancing indicator which controls the resistor tap 15.

The system is essentially independent of the line frequency variations over a moderate range of several cycles per second. No current flows through metal so that electrode problems are eliminated. Stability depends wholly on the stability of several resistors and the dimensions of the toroids.

The capacitor across the output signal resistor is present to adjust the phase of this signal with respect to the reference signal. This maintains a low null voltage throughout the conductivity range from 0 to 60 millimhos per cm.

Since the output signal from the second toroid in the meter is of the order of 1.7 millivolts, the pre-amplifier and balancing amplifier are necessary. The pre-amplifier noise level is about 0.5 microvolt referred to the signal. This low noise level was achieved using a special low-noise triode tube 6072. To reduce the effects of harmonics in the sixty cycles per second supply, a twin-T band pass filter was inserted in the amplifier as indicated.

To take advantage of the linearity of this system, a 25 turn "Helipot" with a resolution of 0.006% and linearity tolerance of ±0.025% is used to supply the reference voltage. Its shaft is geared to a counter which reads directly in conductivity. The linearity was checked using precision resistors to represent the sea water path, and the reading was found to differ from a linear relationship by amounts within the "Helipot" linearity tolerance. This high linearity allows calibration of the system at but one point, thus facilitating set-up and use, when the functional relationship between conductivity, temperatures and salinity is sufficiently well known at all temperatures and salinities. Zero and range adjustments are provided electronically in the indicator, to facilitate field set-up of the system.

In the operations of the conductivity measuring system of my invention, the sensing head is lowered into the water from a boat or ship and the observed temperature and conductivity are read from counter dials arranged in the deck-side units. The system of my invention eliminates glass cells which are subject to shock damage, instability due to electrode fouling, temperature hysteresis, etc., and in improved flushing characteristics as a result of the rather large hole 24 and 28 through the cores.

The linearity of the system depends primarily on the linearity of the balancing potentiometer, which has a rated linearity tolerance of ±0.025%, corresponding to a non-linearity in conductivity readings of ±0.025%, corresponding to a non-linearity in conductivity readings of ±.015 millimho per cm.

The coupling circuit comprising the pair of condensers 59 and 60 and the associated resistors 62 and 63 connected to ground therebetween the condensers 64 constitute a twin-T sixty cycle per second band pass filter to reduce the effects of harmonics. The resistor 65 (100 ohms) in series with the high-voltage-to-ground lead of the power transformer permits the ground on the filament circuit to be precisely set by adjustment of variable tap 73 on potentiometer 74. The coaction of these circuits enables the two-phase motor to be accurately controlled for driving the counter 9. The induced electric currents in the sea water are detected by the current transformer 3 and the signal in the current transformer is directly proportional to conductivity and is indicated by the self-balancing potentiometer 5, which drives the indicating counter 9, for directly reading conductivity.

While I have described my invention particularly as applied to the determination of conductivity of sea water by equipments which may be carried aboard ship to enable conductivity readings to be made in situ, the principles of my invention may be applied to the determination of conductivity of all types and characteristics of liquid.

I have presented certain preferred forms of my invention herein but I realize that modifications may be made and I desire that it be understood that no limitations upon my invention are intended other than may be imposed by the scope of the appended claims.

What I claim as new and desire to secure by Letters Patent of the United States is as follows:

1. A method of measuring the electrical conductivity of a fluid comprising submerging a flux field establishing means and a pickup circuit into the fluid, establishing a field of flux within a toroidal path in the fluid and thereby inducing a voltage in the pickup circuit in magnitude dependent upon the electrical conductivity of the fluid, simultaneously inducing by the flux field a voltage in a reference circuit associated and submerged with the flux field establishing means in bucking relation to said pickup circuit induced voltage whereby the pickup circuit voltage is subtracted from the reference circuit output voltage to produce a resultant voltage directly proportional to the electrical conductivity of the fluid, and utilizing the resultant voltage to directly indicate the electrical conductivity of said fluid.

2. A method of measuring the electrical conductivity of a fluid comprising submerging a flux field establishing means and a pickup circuit into the fluid, establishing a field of flux within a toroidal path in the fluid and thereby inducing a voltage in the pickup circuit in magnitude dependent upon the electrical conductivity of the fluid, simultaneously inducing by the flux field a voltage in a reference circuit associated and submerged with the flux field establishing means in bucking relation to said pickup circuit induced voltage whereby the pickup circuit voltage is subtracted from the reference circuit output voltage to produce a resultant voltage directly proportional to the electrical conductivity of the fluid, amplifying the resultant voltage, and utilizing the amplified resultant voltage to actuate motive means to indicate the electrical conductivity of said fluid while simultaneously varying the pickup circuit output voltage to provide self-balancing qualities to said method.

3. A method of measuring the electrical conductivity of a fluid comprising, establishing a field of flux in the fluid and thereby inducing a voltage in a pickup circuit in magnitude dependent upon the conductivity of said fluid, simultaneously inducing a voltage by the flux in the field in a reference circuit adjacent the flux field establishing means in bucking relation to said induced voltage, whereby the induced voltage is subtracted from the reference voltage to produce a resultant voltage directly proportional to the electrical conductivity of the fluid, and utilizing the resultant voltage to directly indicate the electrical conductivity of said fluid.

4. A method of measuring the electrical conductivity of a fluid comprising establishing a flux field in the fluid being measured for electrical conductivity and thereby inducing a voltage in a pickup circuit, inducing a reference voltage in a reference circuit from the flux field, and comparing the induced voltage in the pickup circuit and the reference voltage to derive a resultant voltage for determining electrical conductivity of the fluid.

5. A method of measuring the electrical conductivity of a fluid comprising establishing a flux field within a toroidal path in the fluid being measured for electrical conductivity and thereby inducing a voltage in a pickup circuit, simultaneously inducing a reference voltage from the flux field in a reference circuit associated with the flux field establishing means, and subtracting the induced voltage in the pickup circuit from the induced reference voltage to obtain an accurate proportional sensing of the electrical conductivity of the fluid.

References Cited in the file of this patent

UNITED STATES PATENTS

| | | |
|---|---|---|
| 2,542,057 | Relis | Feb. 20, 1951 |
| 2,709,785 | Fielden | May 31, 1955 |

OTHER REFERENCES

Article by Gupta et al., Journal of Scientific Instruments, vol. 33, August 1956; pp. 313–314.